US007000706B1

(12) United States Patent
Dover (10) Patent No.: US 7,000,706 B1
(45) Date of Patent: Feb. 21, 2006

(54) AUTOMATIC NET AND CORE TUBE FEEDING SYSTEM FOR A SOD HARVESTER

(75) Inventor: Gary H. Dover, Bucyrus, KS (US)

(73) Assignee: Bucyrus Equipment Co., Inc., Hillsdale, KS (US)

( * ) Notice: Subject to any disclaimer, the term of this patent is extended or adjusted under 35 U.S.C. 154(b) by 0 days.

(21) Appl. No.: 10/894,920

(22) Filed: Jul. 20, 2004

(51) Int. Cl.
A01B 45/04 (2006.01)
(52) U.S. Cl. ............... 172/19; 414/789.7; 414/911
(58) Field of Classification Search ............... 172/19, 172/20; 414/789.7, 911; 111/200
See application file for complete search history.

(56) References Cited

U.S. PATENT DOCUMENTS

| 4,768,431 A | | 9/1988 | Merritt, III et al. |
| 4,790,125 A | | 12/1988 | Merritt, III |
| 4,802,395 A | | 2/1989 | Merritt, III et al. |
| 4,832,130 A | | 5/1989 | Brouwer et al. |
| 4,896,477 A | | 1/1990 | Wagstaff et al. |
| 4,938,004 A | | 7/1990 | Merritt et al. |
| 5,064,000 A | * | 11/1991 | Dover et al. ............... 172/19 |
| 5,230,193 A | | 7/1993 | Underhill et al. |
| 5,289,672 A | | 3/1994 | Underhill |
| 5,319,899 A | | 6/1994 | Jennings et al. |
| RE34,827 E | * | 1/1995 | Dover et al. ............... 172/19 |
| 5,426,923 A | | 6/1995 | Underhill |
| 5,433,067 A | | 7/1995 | Smith |
| 5,448,873 A | | 9/1995 | Jennings et al. |
| 5,626,195 A | * | 5/1997 | Dover ............... 172/19 |
| 5,775,436 A | * | 7/1998 | Noyes et al. ............... 172/20 |
| 5,950,407 A | * | 9/1999 | Rosen ............... 56/131 |
| 6,056,064 A | * | 5/2000 | deVries ............... 172/20 |
| 6,223,830 B1 | * | 5/2001 | deVries ............... 172/19 |
| 6,659,189 B1 | * | 12/2003 | Woerner et al. ............... 172/20 |

* cited by examiner

Primary Examiner—Thomas B. Will
Assistant Examiner—Alexandra Pechhold
(74) Attorney, Agent, or Firm—Erickson & Kleypas, L.L.C.

(57) ABSTRACT

An automatic net and tube feeding system for a sod harvester having a conveyor upon which rolls of sod are formed includes a net feeder comprising a supply roll from which net is dispensed, a pair of feed rollers positioned to engage a portion of the net therebetween and a motor selectively operable to turn one of the feed rollers to eject a length of net onto the conveyor. Also included in the system is a net cutter having a cutting blade pivotally mounted parallel to the feed rollers and a stop bar for locking the supply roll. The system further includes a tube feeder for dispensing core tubes around which the sod rolls are formed, the tube feeder comprising a rack having a discharge opening and a tube dispenser selectively controlling the release of individual core tubes through the discharge opening and onto the conveyor.

35 Claims, 6 Drawing Sheets

AUTOMATIC NET AND CORE TUBE FEEDING SYSTEM FOR A SOD HARVESTER

BACKGROUND OF THE INVENTION

1. Field of the Invention

This invention relates to large roll sod harvesters, and in particular to a net and core tube feeding system for use on such sod harvesters.

2. Description of the Related Art

U.S. Pat. No. Re. 34,827, entitled "Method and Apparatus for Cutting Sod Which Rolls in a Semi-flaccid Sheet into Sod Roll," and commonly owned with the present invention, discloses a large roll sod harvester wherein sod is carried onto a roll-forming conveyor on a layer of net. The conveyor rolls the sod and net into a sod roll which is formed around a core tube or mandrel which then comprises the core of the sod roll. As the roll is formed, the net is pulled from a supply roll mounted below the roll-forming conveyor.

In the disclosed embodiment, a length of the net must be manually pulled off of the supply roll and started onto the conveyor by hand before the sod cutting operation begins. The core tube is also manually placed on the conveyor and retained in position by a rod manually inserted through the center of the core tube. The sod is then manually bent around the core tube to start the roll. After the roll is completed, the net must also be manually cut loose from the supply roll and the process repeated before another roll can be started.

As is apparent from the above description, this original embodiment of the sod harvester required a great deal of manual intervention to form a roll of sod. In order to eliminate this need for human involvement, what is needed is an automatic system for starting and cutting the net, and also for placing the core tubes on the roll-forming conveyor.

SUMMARY OF THE INVENTION

The present invention is an automatic net and core tube feeding system for a sod harvester. The system includes a net feeder and a tube feeder which act in combination to supply net and core tubes to a roll forming conveyor where sod is formed into rolls. The system also includes a net cutter which cuts the net loose from the net feeder once the roll has reached its ultimate size.

The net feeder generally comprises a supply roll from which net is dispensed, a pair of feed rollers positioned to engage a portion of the net therebetween, and a motor selectively operable to turn one of the feed rollers to eject a length of net onto the conveyor. The net cutter includes a cutting blade mounted parallel to the feed rollers which is pivotable between a retracted position and a cutting position wherein the blade engages the net. The net cutter also includes a stop bar which is engageable with a radially extending tooth on the supply roll for locking the supply roll while the a cut is made.

The tube feeder includes a rack mounted above the conveyor and sized to hold a plurality of core tubes. The rack has a discharge opening and a tube dispenser selectively controlling the release of individual ones of the core tubes through the discharge opening and onto the conveyor. The rack preferable includes a removable rack portion which can be lifted off of the sod harvester with a fork lift and refilled with core tubes at ground level. The tube dispenser generally includes a pivot shaft rotatably mounted below the discharge opening, a plurality of distributing plates longitudinally spaced along the pivot shaft and an actuator connected to said pivot shaft and adapted to rotate said pivot shaft between a home position and a drop position.

Each of the distributing plates includes a finger extending radially outwardly from the pivot shaft and a heel having a top edge generally perpendicular to the finger, a bottom edge extending generally opposite the finger and a back edge forming an arcuate bumper extending between the top edge and the bottom edge. When the pivot shaft is in the home position, the fingers extend across the discharge opening and prevent any of the core tubes from passing therethrough. As the pivot shaft moves toward the drop position, one of the core tubes is lifted into a tube cradle formed between the fingers and the top edges of the distributing plates. Simultaneously, the bumper prevents any of the remaining core tubes from advancing toward the discharge opening. When the pivot shaft reaches its drop position, the core tube rolls out of the tube cradle, down the fingers, and drops onto the roll-forming conveyor.

DETAILED DESCRIPTION OF THE PREFERRED EMBODIMENTS

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. The drawings constitute a part of this specification and include exemplary embodiments of the present invention and illustrate various objects and features thereof.

Certain terminology will be used in the following description for convenience in reference only and will not be limiting. For example, the words "upwardly," "downwardly," "rightwardly," and "leftwardly" will refer to directions in the drawings to which reference is made. The words "inwardly" and "outwardly" will refer to directions toward and away from, respectively, the geometric center of the embodiment being described and designated parts thereof. Said terminology will include the words specifically mentioned, derivatives thereof and words of a similar import.

Figure 1:
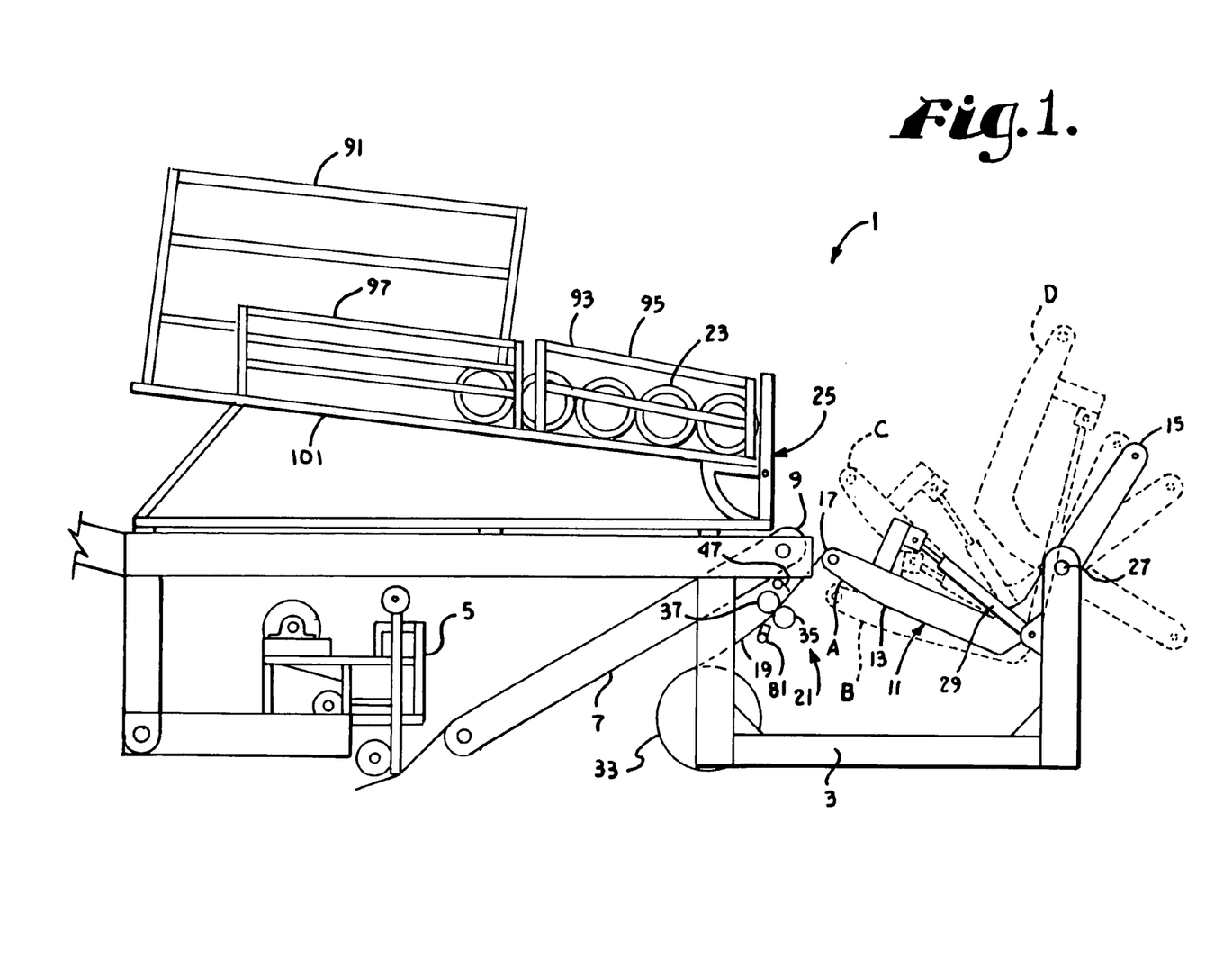
FIG. 1. is a fragmentary, partially schematic side view of a sod harvester incorporating an automatic net and core tube feeding system according to the present invention.

Referring to the drawings in more detail, and in particular to FIG. 1, the reference number 1 generally designates a large roll sod harvester incorporating features according to the present invention. The harvester 1 includes a frame 3 and a pair of cutting heads 5 mounted on the frame 3 which cut sod loose from the ground. The cutting heads 5 are mounted generally as shown in U.S. Pat. Re 34,827, which is commonly owned with the present invention. A front conveyor 7 carries the sod rearwardly and upwardly from the cutting heads 5. The front conveyor 7 has an exit end 9.

The front conveyor 7 delivers the sod to a generally L-shaped rear conveyor 11 having a feed leg 13 and a roll-forming leg 15. The feed leg 13 of the rear conveyor 11 has an entrance end 17. Rolls of sod are formed on the rear conveyor 11 between the legs 13 and 15. The sod is carried on net or mesh 19 which is fed into the rolls along with the sod by a net feeder 21. Each roll of sod is formed around a core tube 23 which is dispensed onto the rear conveyor 11 by a tube feeder 25.

The rear conveyor 11 is pivotally mounted to the frame 3 for movement about a generally horizontal transverse axis 27 and is selectively moveable about the axis 27 by linear actuators 29 which are operatively connected to a hydraulic system of the harvester 1. The rear conveyor 11 has four operating positions: a feed position A wherein the entrance end 17 of the feed leg 13 is in general horizontal alignment with the exit end 9 of the front conveyor 7, a net starting position B wherein the entrance end 17 of the feed leg 13 is dropped below the exit end 9 of the front conveyor 7, a net cutting position C wherein the entrance end 17 of the feed leg 13 is raised above the exit end 9 of the front conveyor 7, and a dump position D wherein the rear conveyor 11 is tipped over rearwardly such that the feed leg 13 is raised into a generally vertical or past vertical orientation.

Figure 2:
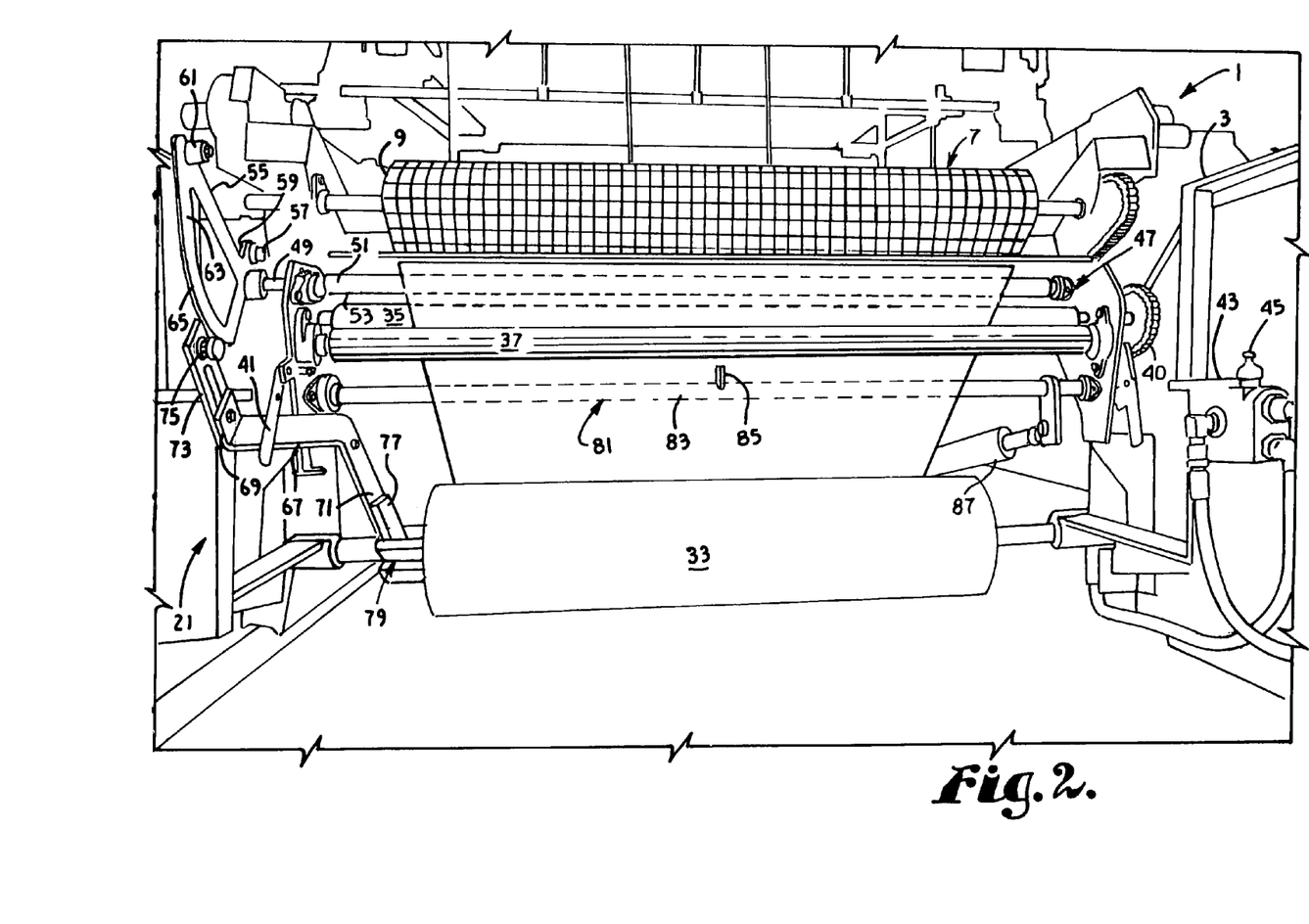
FIG. 2 is a perspective view of the sod harvester of FIG. 1 as seen from a position just behind the front conveyor thereof.
Figure 2A:
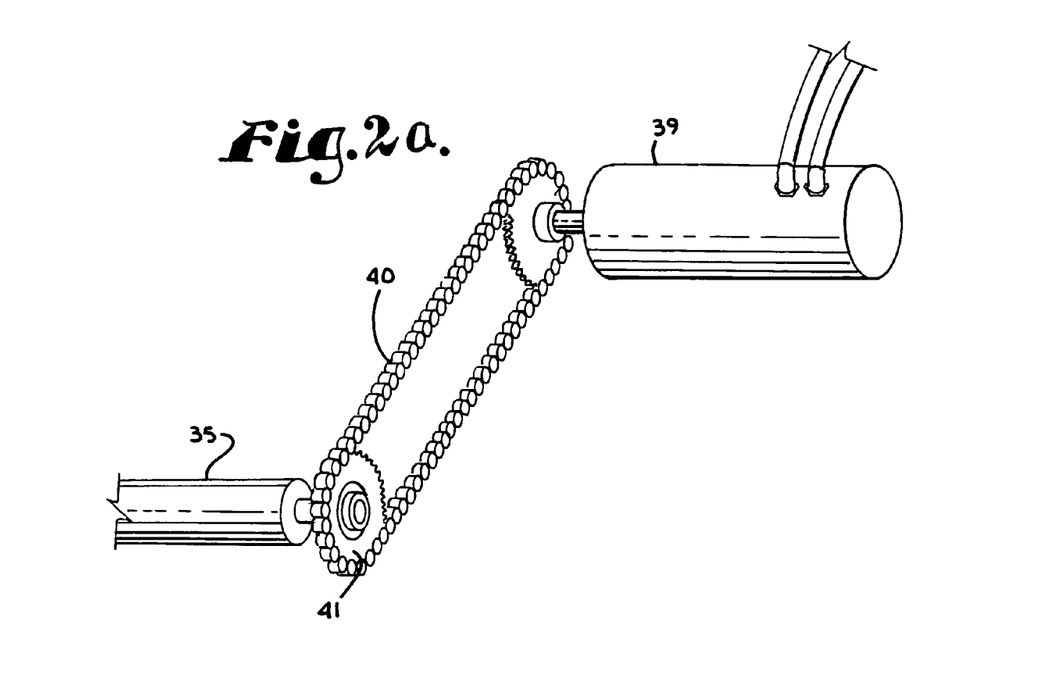
FIG. 2a is a partially schematic representation of a drive motor of a net feeder which forms a part of the present invention.

Referring to FIG. 2, the net feeder 21 is generally located beneath the exit end 9 of the front conveyor 7 and includes a transverse supply roll 33 from which the net 19 is dispensed. Mounted above the supply roll 33 are first and second transverse feed rollers 35 and 37, respectively, between which the net 19 passes. The first feed roller 35 is rotatably mounted to the frame 3 in a fixed position and selectively driven by a hydraulic motor 39 acting through a chain 40 and sprag clutch or one-way bearing 41 (see FIG. 2a). The second feed roller 37 is rotatably and moveably mounted to the frame 3 for movement toward and away from the first feed roller 35. An over-center latch mechanism 42 allows the second feed roller 37 to be drawn toward and clamped against the first feed roller 35, capturing the net 19 therebetween.

The hydraulic motor 39 driving the first feed roller 35 is controlled by a valve 43 which is mounted on the frame 3. The valve 43 has a plunger 45 which is engaged and depressed by the feed leg 13 of the rear conveyor 11 when the rear conveyor 11 moves into its net feeding position. When the plunger 45 is depressed, the motor 39 is engaged, rotating the feed rollers 35 and 37. Rotation of the feed rollers 35 and 37 causes a length of the net 19 to be pulled off the supply roll 33 and ejected onto the feed leg 13 of the rear conveyor 11. The motor 39 stops when the rear conveyor 11 is moved out of its net feeding position and back into its feed position, thereby releasing the plunger 45. The rear conveyor 11 preferably remains in the net feeding position long enough for approximately one foot of the net 19 to be dispensed.

Pivotally mounted to the frame 3 above the feed rollers 35 and 37 is a net cutoff knife 47. The knife 47 comprises a knife shaft 49 and a blade 51 which is secured to the shaft 49 and extends tangentially outward therefrom. The blade 51 includes an sharpened distal edge 53. The knife 47 is pivotable between a retracted position wherein the edge 53 is angled rearwardly away from the net 19 and a cutting position wherein the edge 53 is brought into engagement with the net 19.

Figure 3:
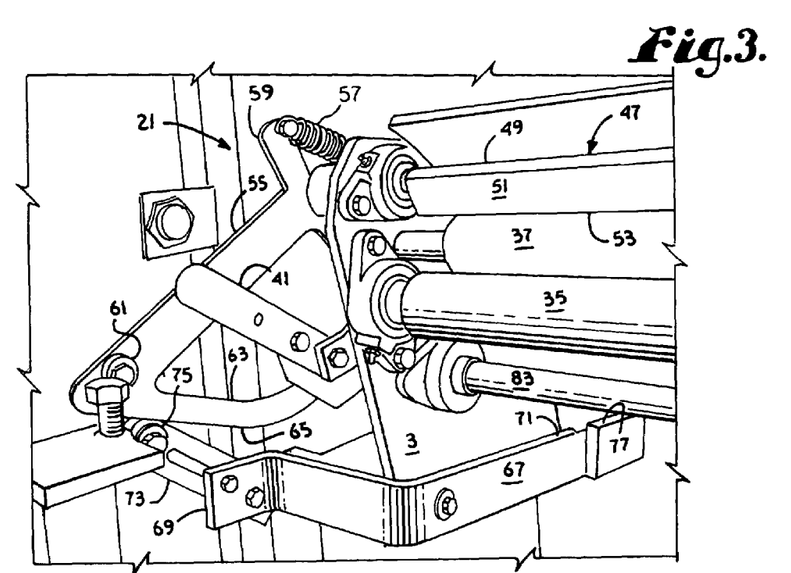
FIG. 3 is a fragmentary perspective view of the net feeder.

Referring to FIG. 3, movement of the knife 47 is controlled by a lever arm 55 which extends radially outward from the shaft 49 and rearwardly therefrom. The knife 47 is urged into the cutting position by an extension spring 57 connected between the frame 3 and a lug 59 on the lever arm 55. A roller 61 mounted proximate the distal end of the arm 55 is engageable by the feed leg 13 of the rear conveyor 11. When the rear conveyor 11 is in its feed position or net starting position, the feed leg 13 acts downwardly on the lever arm 55 and counters the action of the spring 57 to move the knife 47 into its retracted position (see FIG. 3). When the rear conveyor 11 moves upwardly into its net cutting position, pressure on the lever arm 55 is relaxed and the spring 57 acts to move the knife 47 into its cutting position (see FIG. 2).

Connected to the lower edge of the lever arm 55 is an arcuate member 63 having a cam surface 65 formed by its lower edge. A stop bar 67 is pivotally connected to the frame 3 above the supply roll 33 and below the feed rollers 35 and 37. The stop bar 67 has opposed first and second ends 69 and 71, respectively. Selectively slidably mounted to the first end 69 of the stop bar 67 is an adjustable carrier 73 which carries a roller follower 75. The roller follower 75 rollingly engages the cam surface 65 of the arcuate member 63. The second end 71 of the stop bar 67 includes a pawl 77 which is engageable with a ratchet 79 on the supply roll 33 having radially extending teeth or fins 80. The stop bar 67 is balanced such that the second end 71 is urged downwardly by its own weight. As the rear conveyor 11 moves between its various positions, the lever arm 55 also moves, causing the roller follower 75 to move along the cam surface 65 of the arcuate member 63.

The arcuate member 63 is shaped such that the ratchet pawl 77 is held upwardly, away from the ratchet 79, when the rear conveyor 11 is in its feed position or net starting position (see FIG. 3), but as the rear conveyor 11 moves upwardly into its net cutting position, the first end 69 of the stop bar 67 pivots downwardly until the pawl 77 engages one of the teeth 80 and thereby locks the supply roll 33 (see FIG. 2). As will be explained in more detail later, this causes the net 19 to be pulled tightly against the sharpened edge 53 of the knife 47, cutting the net 19.

Referring again to FIG. 2, a net splitter 81 mounted below the feed rollers 35 and 37 includes a transverse net splitter shaft 83 pivotally mounted to the frame 3 and a blade 85 which extends perpendicularly outward from the shaft 83 proximate a midline of the conveyors 7 and 11. The shaft 83 is pivotable between a cutting position wherein the blade 85 is in engagement with the net 19 and a retracted position wherein the blade 85 is clear of the net 19. The shaft 83 is selectively pivoted by a linear actuator 87 mounted between the frame 3 and a lever arm 89 extending radially outwardly from the shaft 83 proximate one end thereof. The net splitter 81 allows the operator to selectively form two half-width rolls of sod instead of a single full-width roll by splitting the net 19 in two. Pairs of half-length core tubes (not shown) are used in place of the full length tubes 23 when half-width rolls are desired. The sod itself does not need to be split since each of the cutting heads 5 naturally produces a respective strip of sod and only the net 19 and tube 23 normally hold the two strips together to form a single full-width roll.

Figure 4A:
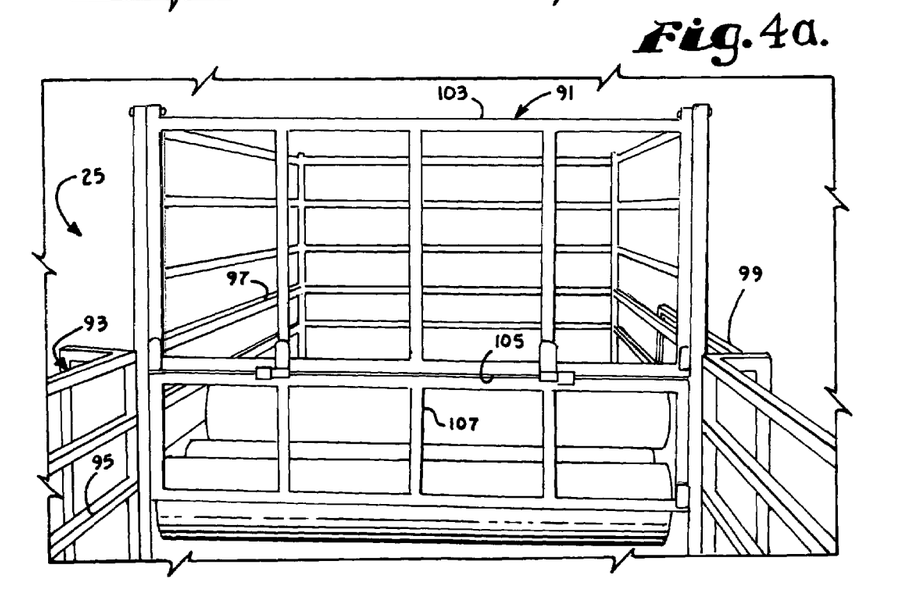
FIGS. 4a–4c are fragmentary perspective views of a core tube feeder which forms a part of the present invention.
Figures 4B, 4C:
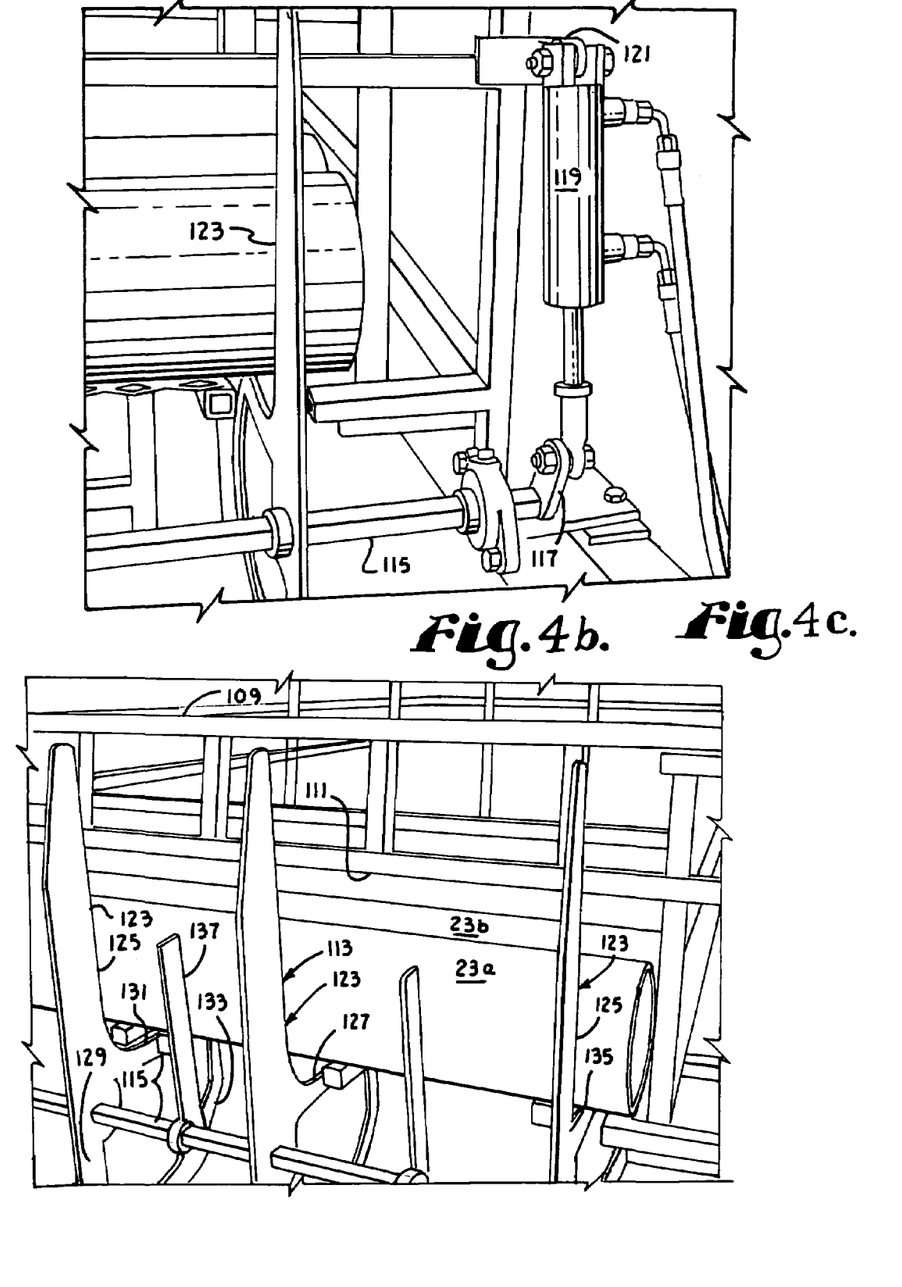

Referring to FIG. 4, the tube feeder 25 is mounted above the front conveyor 7 and includes a removable rack 91 and a fixed rack 93. Both racks 91 and 93 may be constructed of square steel tubing. The fixed rack 93 has a forward compartment 95 and a rearward compartment 97. The removable rack 91 generally comprises a box sized to hold a plurality of core tubes 23, for example sixty tubes 23. The forward compartment 95 of the fixed rack 93 is sized to receive the removable rack 91 and serves as a docking station for the removable rack 91. The forward compartment 95 includes a side gate 99 through which the removable rack 91 can be removed and inserted using a forklift (not shown). The removable nature of the rack 91 allows it to be lowered to ground level for ease of loading with core tubes 23. Once loaded, the removable rack 91 is then lifted by the forklift and reinserted into the forward compartment 97 through the side gate 99. The side gate 99 is then closed to retain the removable rack 91.

The forward and rearward compartments 95 and 97 of the fixed rack 93 share a floor 101 which slopes downwardly from front to rear. The removable rack 71 includes a rearward wall 103 having a discharge opening 105 positioned at its lower end. An upwardly pivotable tailgate 107 selectively covers the discharge opening 105. The discharge opening 105 is sized such that, when the tailgate 107 is open, a single layer of the core tubes 23 will roll through the discharge opening 105 and into the rearward compartment 97.

The rearward compartment 97 of the fixed rack 93 includes a rear wall 109 having an opening 111 equipped with a tube dispenser 113 designed to drop individual ones of the core tubes 23 onto the rear conveyor 11 at the proper intervals. The dispenser 113 includes a transverse pivot shaft 115 rotatably mounted to the fixed rack 93 below the opening 111. A lever arm 117 is connected to the pivot shaft 115 proximate one of its ends and extends radially outwardly therefrom. A linear actuator 119, such as a double acting hydraulic cylinder, is connected between lever arm 117 and a lug 121 extending outwardly from the fixed rack 93. The actuator 119 is operable to rotate the pivot shaft 115 between a home position and a tube drop position.

Laterally spaced along the pivot shaft 115 are a plurality of distributing plates 123. Each distributing plate 123 includes a finger 125 which extends generally radially outward from the pivot shaft 115 and a heel 127. The heel 127 of each distributing plate 123 includes a bottom bar 129 which extends opposite the respective finger 125 and a top bar 131 which is generally perpendicular to the respective finger 125. The bottom bar 129 and top bar 131 of each heel 127 are connected by an arcuate bumper 133. A tube cradle 135 is defined by the fingers 125 and top bars 131 of the distributing plates 123. Interposed between the distributing plates 123 are respective short arms 137 which are generally in alignment with the fingers 125.

Figure 5A:
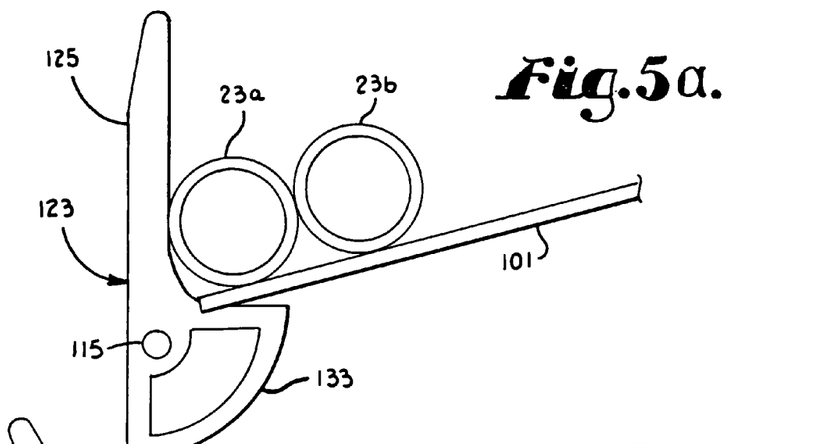
FIGS. 5a–5c are schematic views showing operation of the tube feeder.
Figures 5B, 5C:
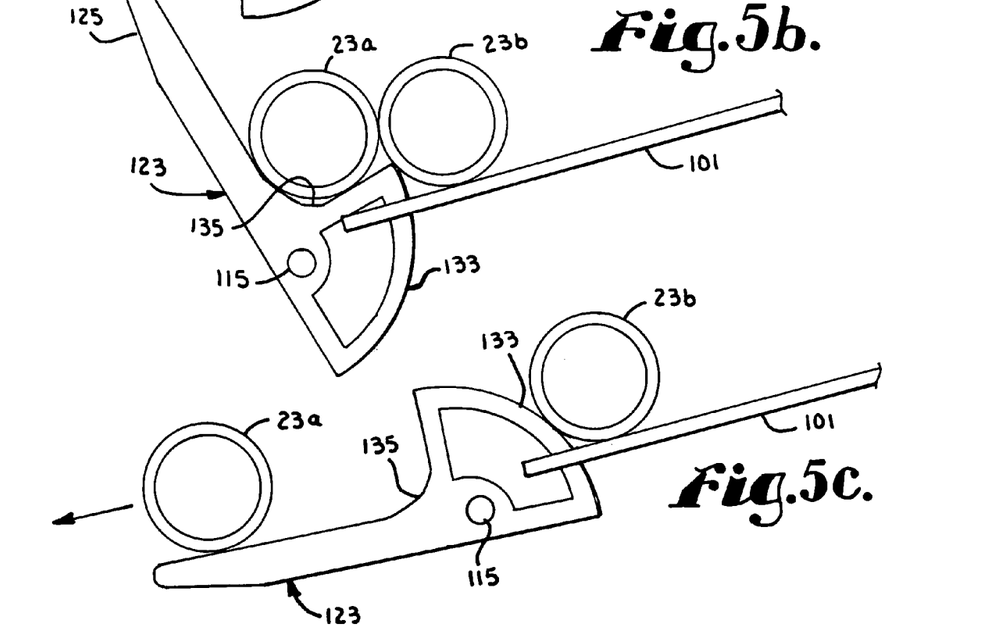

Referring to FIG. 5a, when the pivot shaft 115 is in the home position the fingers 125 are pointed upwardly and the top bars 131 of the heels 127 are positioned below the floor 101. Due to the slope of the floor 101, any core tubes 23 located in the rearward compartment 97 of the fixed rack 93 will roll rearwardly until a rearwardmost core tube 23a of the core tubes 23 is abutted against the fingers 125. When the actuator 119 begins to extend, as in FIG. 5b, the fingers 125 will begin to move downwardly and the top bars 131 will begin to move upwardly, thereby urging the rearwardmost core tube 23a into the tube cradle 135. Simultaneously, the bumper 133 will engage a second most rearward core tube 23b of the core tubes 23 and prevent it from rolling rearwardly. Referring to FIG. 5c, when the pivot shaft 115 reaches the tube drop position, the fingers 125 become downwardly and rearwardly sloped such that the core tube 23a will roll out of the tube cradle 135 and down the fingers 125 until it drops off the ends fingers 125 and onto the rear conveyor 11. The pivot shaft 115 is then returned to the home position by retraction of the actuator 119. Once the top bars 131 drop below the floor 101 the core tube 23b will roll up against the fingers 125 and will remain there until such time as the process is repeated.

In order to start a roll of sod, the rear conveyor 11 is pivoted downwardly into its net starting position. The feed leg 13 contacts the plunger 45, opening the valve 43 and causing the motor 39 to turn the first feed roller 35 and thereby advance approximately one foot of net 19 onto the feed leg 13 of the rear conveyor 11. Simultaneously, the rear conveyor 11 is started so that the net 19 is drawn flat onto the conveyor 11. The rear conveyor 11 then stops and tips upwardly into the feed position, releasing the plunger 45 and closing the valve 43 such that rotation of the motor 39 ceases.

When the rear conveyor 11 reaches the feed position a conveyor position sensor (not shown) sends a signal to a controller (not shown), causing the controller to extend the actuator 119 on the tube dispenser 113 to pivot the fingers 125 downwardly, thereby dropping a core tube 23 onto the feed leg 13. After the core tube 23 drops and the pivot shaft 115 reaches its drop position and, a pivot shaft sensor (not shown) sends a signal to the controller which then retracts the actuator 119, moving the pivot shaft 115 back into the home position and the fingers 125 into an upward orientation.

At this point in the cycle, both the front conveyor 7 and rear conveyor 11 are started and the harvester 1 is advanced to cut a strip of sod. The sod comes off the front conveyor 7 and onto the rear conveyor 11 on top of the net 19. The net 19 and sod are both advanced by the action of the feed leg 13 of the rear conveyor 11. The sprag clutch 41 allows the feed rollers 35 and 37 to freewheel as the net 19 is pulled through them, without resistance from the then inactive motor 39. The roll forming leg 15 turns the sod and net 19 upwardly such that they both wrap around the core tube 23 to form a roll. The sod continues to feed onto the rear conveyor 11 and into the roll until a predetermined length of sod is accumulated and a cut end of the sod reaches the exit end 9 of the front conveyor 7. (The sod is cut by a sod cutting mechanism which is not part of the present invention.) At this time, forward progress of the harvester 1 is halted and both the front conveyor 7 and rear conveyor 11 are stopped.

In order to wrap the sod roll in net 19, the rear conveyor 11 only is restarted, for 1–2 revolutions rotating the sod roll 11 and pulling additional net onto the sod roll. The rear conveyor then stops and is pivoted upwardly into its net cutting position. As this happens, the knife 47 pivots into its cutting position and the ratchet pawl 77 engages one of the teeth 80 of the ratchet 79 to stop rotation of the net supply roll 33. With the supply roll 33 locked and the feed leg 13 of the rear conveyor 11 tipping upwardly, the net 19 is pulled tightly across the cutting edge 53 of the knife 47 and thereby severed. The rear conveyor is then restarted briefly to wrap the loose end of the net 19 onto the sod roll. When the sod roll is completely wrapped, the rear conveyor 11 stops and is then pivoted upwardly into the dumping position, causing the sod roll to be deposited over the end of the roll forming leg 15 and to the rear of the harvester 1. In order to move the sod roll out of the way of the next pass of the harvester 1, a cart (not shown) having a turntable thereon may be hitched behind the harvester 1 to catch the sod rolls as they come off of the rear conveyor 11 and turn them ninety degrees about a vertical axis. The sod rolls can then be dumped off the outboard side the cart such that they roll away from the remaining uncut sod.

Once the sod roll is dumped, the rear conveyor moves back into its net starting position and the process is repeated for the next sod roll. All of the movements of the rear conveyor 11 and other components of the harvester 1 may be automatically controlled such that the cutting and baling process takes place with minimal input from the operator.

It is to be understood that while certain forms of the present invention have been illustrated and described herein, it is not to be limited to the specific forms or arrangement of parts described and shown.

The invention claimed is:

1. A net feeding and cutting system for a sod harvester having a conveyor upon which rolls of sod are formed, the sod being carried onto the conveyor on a layer of net, and wherein the conveyor is pivotable between a feed position and a raised net cutting position, said system comprising:
   a) a supply roll from which net is dispensed;
   b) a pair of feed rollers positioned to engage a portion of the net therebetween;
   c) a motor selectively operable to turn one of said feed rollers to eject a length of net onto the conveyor;
   d) a cutting blade mounted parallel to said feed rollers and pivotable between a retracted position and a cutting position;
   e) a shaft carrying said cutting blade;
   f) a lever arm extending radially outwardly from said shaft below the conveyor; and
   g) a spring urging said cutting blade into its net cutting position; wherein
   h) in its feed position the conveyor contacts said lever arm to overcome the action of said spring to retain said cutting blade in its retracted position and when moved to its net cutting position the conveyor allows said spring to move said cutting blade to its cutting position.

2. The system as in claim 1 and further including means for locking said supply roll as said cutting blade moves into its cutting position.

3. The system as in claim 2 wherein said means for locking comprises:
   a) an arcuate member connected to said lever arm and extending downwardly therefrom;
   b) a stop bar pivotally mounted to the harvester below said lever arm and above said supply roll, said stop bar having first and second ends, said second end including a pawl;
   c) a can follower mounted on said first end of said stop bar and in moveable contact with said arcuate member; and
   d) at least one radially extending tooth on said supply roll engageable by said pawl when movement of the conveyor into its net cutting position allows said lever arm to move upwardly.

4. The system as in claim 1 in combination with a net splitter having a shaft with a radially extending blade selectively engageable with the net to split the net longitudinally such that two separate rolls of sod are formed simultaneously on the conveyor.

5. The system as in claim 1 in combination with a tube feeder for dispensing core tubes around which the sod rolls are formed, said tube feeder comprising:
   a) a rack mounted above the conveyor and sized to hold a plurality of core tubes, said rack having a discharge opening and a floor sloped toward said discharge opening;
   b) a tube dispenser selectively controlling the release of individual ones of the core tubes through said discharge opening and onto the conveyor.

6. A net and core tube feeding system for a sod harvester of the type having a conveyor upon which rolls of sod are formed around a core tube, the sod being carried onto the conveyor on a layer of net, said system comprising a net feeder in combination with a tube feeder, said net feeder comprising:
   a) a supply roll from which net is dispensed
   b) a pair of feed rollers positioned to engage a portion of the net therebetween; and
   c) a motor selectively operable to turn one of said feed rollers to eject a length of net onto the conveyor, and said tube feeder comprising:
   d) a rack mounted above the conveyor and sized to hold a plurality of core tubes, said rack having a discharge opening and a floor sloped toward said discharge opening; and
   e) a tube dispenser selectively controlling the release of individual ones of the core tubes through said discharge opening and onto the conveyor; wherein said tube dispenser comprises:
      i) a pivot shaft rotatably mounted below said discharge opening;
      ii) a plurality of fingers spaced along said pivot shaft and extending radially outwardly therefrom; and
      iii) an actuator connected to said pivot shaft and adapted to rotate said pivot shaft between a home position wherein said fingers block said discharge opening and a drop position wherein said fingers extend outwardly away from said discharge opening.

7. The system as in claim 6 wherein said tube dispenser further includes a plurality of top bars extending radially outward from said pivot shaft, each said top bar being generally perpendicular to a respective one of said fingers, said top bars and said fingers collectively forming a tube cradle.

8. The system as in claim 7 wherein said tube dispenser further includes a plurality of bumpers, each said bumper being connected to a respective one of said top bars, said bumpers acting to block said discharge opening when said pivot shaft is in said drop position.

9. The system as in claim 8 wherein each said finger along with its respective top bar and bumper comprise parts of a unitary distributing plate.

10. The system as in claim 6 wherein each of said fingers comprises part of a respective distributing plate and each said distributing plate further includes
   a heel having a top edge generally perpendicular to said finger, a bottom edge extending generally opposite said finger and a back edge forming an arcuate bumper extending between said top edge and said bottom edge.

11. The system as in claim 6 wherein said rack includes a stationary rack fixedly connected to the sod harvester and a removable rack separable from said stationary rack.

12. The system as in claim 11 wherein said stationary rack includes a first compartment adapted to receive said removable rack and a second compartment adjacent said first compartment, said second compartment including said discharge opening.

13. The system as in claim 12 wherein said removable rack includes a passthrough sized and positioned to allow a single layer of core tubes to roll into said second compartment, said passthrough being selectively closeable by a tailgate.

14. The system as in claim 6 wherein said rack includes a first compartment sized to receive a plurality of core tubes in multiple layers and a second compartment adjacent said first compartment and including said discharge opening, said second compartment being separated from said first compartment by a wall having passthrough therein, said passthrough being sized and positioned to allow a single layer of core tubes to roll into said second compartment, said passthrough being selectively closeable by a tailgate.

15. The system as in claim 14 wherein said first compartment includes a removable rack separable from the sod harvester.

16. The system as in claim 6 wherein said tube dispenser further includes a plurality of top bars extending radially outward from said pivot shaft, each said top bar being generally perpendicular to a respective one of said fingers, said top bars and said fingers collectively forming a tube cradle.

17. The system as in claim 16 wherein said tube dispenser further includes a plurality of bumpers, each said bumper being connected to a respective one of said top bars, said bumpers acting to block said discharge opening when said pivot shaft is in said drop position.

18. The system as in claim 17 wherein each said finger along with its respective top bar and bumper comprise parts of a unitary distributing plate.

19. A net and core tube feeding system for a sod harvester of the type having a conveyor upon which rolls of sod are formed around a core tube, the sod being carried onto the conveyor on a layer of net, said system comprising a net feeder in combination with a tube feeder, said net feeder comprising:
   a) a supply roll from which net is dispensed;
   b) a pair of feed rollers positioned to engage a portion of the net therebetween; and
   c) a motor selectively operable to turn one of said feed rollers to eject a length of net onto the conveyor; and said tube feeder comprising:
   d) a rack mounted above the conveyor and sized to hold a plurality of core tubes, said rack having a discharge opening and a floor sloped toward said discharge opening; and
   e) a tube dispenser selectively controlling the release of individual ones of the core tubes through said discharge opening and onto the conveyor wherein said tube dispenser comprises:
      i) a pivot shaft rotatably mounted below said discharge opening;
      ii) a plurality of distributing plates spaced along said pivot shaft, each said distributing plate including:
         (1) a finger extending radially outwardly from said pivot shaft; and
         (2) a heel having a top edge generally perpendicular to said finger, a bottom edge extending generally opposite said finger and a back edge forming an arcuate bumper extending between said top edge and said bottom edge; and
      iii) an actuator connected to said pivot shaft and adapted to rotate said pivot shaft between a home position wherein said fingers block said discharge opening and a drop position wherein said fingers extend outwardly away from said discharge opening.

20. The system as in claim 19 wherein said rack includes a stationary rack fixedly connected to the sod harvester and a removable rack separable from said stationary rack.

21. The system as in claim 20 wherein said stationary rack includes a first compartment adapted to receive said removable rack and a second compartment adjacent said first compartment, said second compartment including said discharge opening.

22. The system as in claim 21 wherein said removable rack includes a passthrough sized and positioned to allow a single layer of core tubes to roll into said second compartment, said passthrough being selectively closeable by a tailgate.

23. The system as in claim 19 wherein said rack includes a first compartment sized to receive a plurality of core tubes in multiple layers and a second compartment adjacent said first compartment and including said discharge opening, said second compartment being separated from said first compartment by a wall having passthrough therein, said passthrough being sized and positioned to allow a single layer of core tubes to roll into said second compartment, said passthrough being selectively closeable by a tailgate.

24. The system as in claim 23 wherein said first compartment includes a removable rack separable from the sod harvester.

25. The system as in claim 19 and further including a net cutter comprising a cutting blade mounted parallel to said feed rollers and pivotable between a retracted position and a cutting position.

26. The system as in claim 25 adapted for a sod harvester wherein the conveyor is pivotable between a feed position and a raised net cutting position, the net cutter further comprising:
   a) a shaft carrying said cutting blade;
   b) a lever arm extending radially outwardly from said shaft below the conveyor; and
   c) a spring urging said cutting blade into its net cutting position; wherein
   d) in its feed position the conveyor contacts said lever arm to overcome the action of said spring to retain said cutting blade in its retracted position and when moved to its net cutting position the conveyor allows said spring to move said cutting blade to its cutting position.

27. The system as in claim 26 wherein said net cutter further includes means for locking said supply roll as said cutting blade moves into its cutting position.

28. The system as in claim 27 wherein said means for locking comprises:
   a) an arcuate member connected to said lever arm and extending downwardly therefrom;
   b) a stop bar pivotally mounted to the harvester below said lever arm and above said supply roll, said stop bar having first and second ends, said second end including a pawl;
   c) a cam follower mounted on said first end of said stop bar and in moveable contact with said arcuate member; and
   d) at least one radially extending tooth on said supply roll engageable by said pawl when movement of the conveyor into its net cutting position allows said lever arm to move upwardly.

29. The system as in claim 19 and further including a net splitter having a shaft with a radially extending blade selectively engageable with the net to split the net longitudinally such that two separate rolls of sod are formed simultaneously on the conveyor.

30. A net feeding and cutting system for a sod harvester having a conveyor upon which rolls of sod are formed, the conveyor being pivotable between a feed position and a net cutting position, said system comprising:
   a) a supply roll from which net is dispensed;
   b) means for injecting a layer of net into a roll of sod forming on the conveyor;
   c) a cutting blade mounted transverse to a path of the net between said supply roll and the roll of sod, said cutting blade being pivotable between a cutting position wherein said blade engages said net and a retracted position;

d) means for moving said cutting blade from said retracted position into said cutting position, said means for moving being responsive to said conveyor pivoting from the feed position into the net cutting position.

31. The system as in claim 30 wherein the net cutting position of said conveyor is a raised position and said means for moving comprises:
   a) a lever arm connected to said cutting blade and extending radially outwardly therefrom below the conveyor; and
   b) a spring urging said cutting blade into its net cutting position; wherein
   c) in its feed position the conveyor contacts said lever arm to overcome the action of said spring to retain said cutting blade in its retracted position and when moved to its net cutting position the conveyor allows said spring to move said cutting blade to its cutting position.

32. The system as in claim 30 wherein said means for injecting comprises:
   a) a pair of feed rollers positioned to engage a portion of the net therebetween; and
   b) a motor selectively operable to turn one of said feed rollers to eject a length of net onto the conveyor such that the sod is carried onto the conveyor on a layer of net and the net is rolled into the sod roll with the sod.

33. The system as in claim 30 and further including means for locking said supply roll as said cutting blade moves into its cutting position.

34. The system as in claim 33 wherein said means for locking comprises:
   a) an arcuate member connected to said lever arm and extending downwardly therefrom;
   b) a stop bar pivotally mounted to the harvester below said lever arm and above said supply roll, said stop bar having first and second ends, said second end including a pawl;
   c) a cam follower mounted on said first end of said stop bar and in moveable contact with said arcuate member; and
   d) at least one radially extending tooth on said supply roll engageable by said pawl when movement of the conveyor into its net cutting position allows said lever arm to move upwardly.

35. The system as in claim 30 in combination with a net splitter, said net splitter comprising:
   a) a shaft mounted transverse to a path of the net between said supply roll and the roll of sod; and
   b) a radially extending blade connected to said shaft proximate a midline of the net; wherein
   c) said shaft is pivotable between a retracted position and a cutting position wherein said blade engages said net to split the net longitudinally such that two separate rolls of sod are formed simultaneously on the conveyor.

* * * * *